(12) United States Patent
Ohta et al.

(10) Patent No.: US 6,809,128 B2
(45) Date of Patent: Oct. 26, 2004

(54) INK COMPOSITION COMPRISING CATIONIC WATER-SOLUBLE RESIN, AND INK SET

(75) Inventors: Hitoshi Ohta, Nagano (JP); Kazuhiko Kitamura, Nagano (JP)

(73) Assignee: Seiko Epson Corporation, Tokyo-To (JP)

( * ) Notice: Subject to any disclaimer, the term of this patent is extended or adjusted under 35 U.S.C. 154(b) by 0 days.

(21) Appl. No.: 09/444,465

(22) Filed: Nov. 22, 1999

(65) Prior Publication Data

US 2002/0147251 A1 Oct. 10, 2002

(30) Foreign Application Priority Data

Nov. 27, 1998 (JP) .......................... 10-337332
Feb. 12, 1999 (JP) .......................... 11-034013

(51) Int. Cl.$^7$ .................. C09D 11/10; C08L 39/00; C08L 39/02; C08L 39/04
(52) U.S. Cl. .................. 523/160; 524/548; 524/555
(58) Field of Search .................. 523/160, 161; 524/548, 555; 106/31.43, 31.49, 31.75, 31.78; 528/328.3

(56) References Cited

U.S. PATENT DOCUMENTS

| | | | | |
|---|---|---|---|---|
| 4,659,382 A | | 4/1987 | Kang | 106/22 |
| 5,017,224 A | | 5/1991 | Tomita | 106/22 |
| 5,019,164 A | | 5/1991 | Tomita | 106/22 |
| 5,555,008 A | * | 9/1996 | Stoffel et al. | 347/100 |
| 5,746,818 A | * | 5/1998 | Yatake | 106/31.86 |
| 5,861,447 A | * | 1/1999 | Nagasawa et al. | 523/161 |
| 5,948,512 A | * | 9/1999 | Kubota et al. | 428/195 |
| 5,985,015 A | * | 11/1999 | Kanaya | 106/31.6 |
| 6,022,908 A | * | 2/2000 | Ma et al. | 523/160 |
| 6,030,441 A | * | 2/2000 | Kubota et al. | 106/31.75 |
| 6,039,768 A | * | 3/2000 | Ouziel | 8/543 |
| 6,075,069 A | * | 6/2000 | Takemoto | 523/160 |

FOREIGN PATENT DOCUMENTS

| | | |
|---|---|---|
| EP | 0 434 179 | 6/1991 |
| EP | 0867483 | 9/1998 |
| JP | 62(1987)-238783 | 10/1987 |
| JP | 63(1988)-63764 | 3/1988 |
| JP | 2(1990)-255876 | 10/1990 |
| JP | 7(1995)-305011 | 11/1995 |
| JP | 9302026 | * 11/1997 |
| WO | 98/21283 | 5/1998 |

OTHER PUBLICATIONS

English Translation of JP09302026, 1997.*
JPO Abstract 62(1987)–238783, Oct. 19, 1987.
JPO Abstract 63(1988)–63764, Mar. 22, 1988.
JPO Abstract 7(1995)–305011, Nov. 21, 1995.
JPO Abstract 2(1990)–255876, Oct. 16, 1990.
English translation of WO 98/21283 dated May 22, 1998.

* cited by examiner

*Primary Examiner*—Callie Shosho
(74) *Attorney, Agent, or Firm*—Ladas & Parry

(57) ABSTRACT

Disclosed is an ink composition which has good storage stability and, in addition, can yield prints having good waterfastness and lightfastness. The ink composition comprises an alkali-soluble colorant, a water-soluble organic solvent, water, and a cationic water-soluble resin comprising units (a) and units (b1) or units (b2):

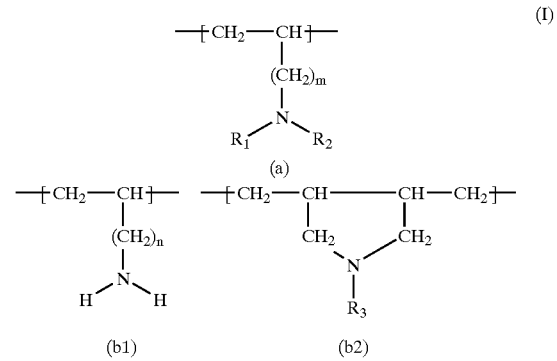

wherein $R_1$, and $R_2$, which may be the same or different, each represent a $C_{1-5}$ alkyl group; $R_3$ represents a hydrogen atom or a $C_{1-5}$ alkyl group; and m and n are each 0, 1, or 2.

30 Claims, No Drawings

INK COMPOSITION COMPRISING CATIONIC WATER-SOLUBLE RESIN, AND INK SET

BACKGROUND OF THE INVENTION

1. Field of the Invention

The present invention relates to an ink composition suitable for ink jet recording.

2. Background Art

Realization of images having good waterfastness and lightfastness and, at the same time, having no significant feathering or bleeding is important for printing of images using ink compositions.

In order to realize good waterfastness, as exemplified below, a combination of a cationic resin with an anionic dye has hitherto been used.

For example, Japanese Patent Laid-Open No. 119280/1987 discloses an ink comprising a hydroxyethylated polyethyleneimine polymer and a dye component. This publication describes that the combination of the hydroxyethylated polyethyleneimine polymer with the dye component can develop waterfastness. Japanese Patent Publication No. 91494/1995 discloses an ink comprising a hydroxyalkylated polyallylamine polymer and a dye. The claimed advantage of this ink is the development of waterfastness through the combination of the hydroxyalkylated polyallylamine polymer with the dye. In these two inks, howerver, since hydroxyalkyl groups having high hydrophilicity are contained in the polymer used, a further improvement is required to ensure satisfactory waterfastness of printed images.

Japanese Patent Laid-Open Nos. 255876/1990, 296878/1990, and 188174/1991 disclose ink compositions comprising a polyamine, with a molecular weight of not less than 300, having primary amino groups, an anionic dye, and a stability-imparting agent. These publications describe that the combination of the primary amino group with the anionic dye can develop waterfastness. Disadvantageously, however, the resins used in these publications strongly attack the dye. Specifically, according to studies conducted by the present inventors, for example, when this ink is allowed to stand at high temperatures, in some cases, the dye is decomposed or otherwise the photodecomposition of the print is accelerated to render the lightfastness lower than that of an ink containing only the dye. This tendency is significant in ink compositions containing some magenta dyes. In the case of ink compositions other than the magenta dye-containing ink compositions, the storage stability of ink compositions and the lightfastness and waterfastness of prints could be balanced by bringing the content of the primary amino group to not more than about 20% by mole based on the total content of the side chain group in the polymer. However, in the case of the ink compositions containing the specific magenta dye, this level of amount of the resin added is insufficient and cannot offer satisfactory waterfastness of printed images.

Japanese Patent Laid-Open No. 305011/1995 discloses a water-base ink comprising a basic water-soluble polymer, an anionic dye with the counter ion being a volatile base, and a buffering agent with the counter ion being a volatile base. This publication describes that, in the ink, the volatile base prevents the dissociation of the polymer and, after printing, the volatile base on paper is evaporated to allow a salt-forming reaction between the polymer and the dye to proceed, thereby developing waterfastness.

Japanese Patent Laid-Open No. 238783/1987 discloses an ink jet recording sheet comprising a homopolymer of an acid salt of diallylamine or an acid salt of monoallylamine or a copolymer of the acid salt of diallylamine with the acid salt of monoallylamine. The claimed advantage of this ink jet recording sheet is that an insolubilized reaction of the polymer with the dye takes place on the recording medium to develop waterfastness. In the recording method using the recording medium containing the cationic resin disclosed in this publication, since the ink per se does not have waterfastness, use of a recording medium other than described in the publication cannot develop the waterfastness in the printed image.

Further, the formation of images having no significant feathering or bleeding, especially the prevention of color-to-color bleeding involved in use of two or more color inks, is also important.

SUMMARY OF THE INVENTION

The present inventors have now found that an ink composition containing a cationic water-soluble resin having a specific structure can realize images having excellent waterfastness and lightfastness and, at the same time, having no significant feathering or bleeding. The present invention has been made based on such finding.

Accordingly, it is an object of the present invention to provide an ink composition which realize images having excellent waterfastness and lightfastness and, at the same time, having no significant feathering or bleeding, especially no significant color-to-color bleeding.

In particular, it is an object of the present invention to provide an ink composition which can be advantageously used for ink jet recording.

According to one aspect of the present invention, there is provided an ink composition comprising at least an alkali-soluble colorant, a water-soluble organic solvent, water, and a cationic water-soluble resin, said cationic water-soluble resin comprising repeating units (a) represented by formula (a) in formula (I) and repeating units (b1) represented by formula (b1) in formula (I) or repeating units (b2) represented by formula (b2) in formula (I):

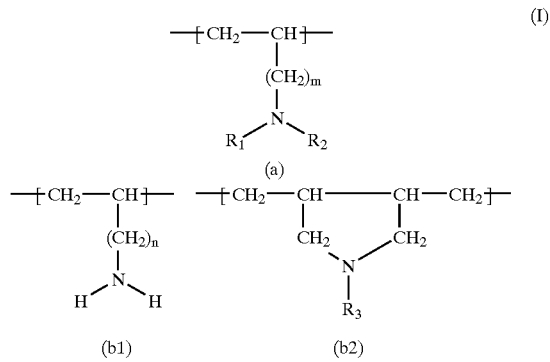

wherein
$R_1$ and $R_2$, which may be the same or different, each represent a $C_{1-5}$ alkyl group;
$R_3$ represents a hydrogen atom or a $C_{1-5}$ alkyl group; and
m and n are each 0, 1, or 2.

DESCRIPTION OF THE PREFERRED EMBODIMENTS

Ink Composition

The ink composition according to the present invention may be used in recording methods using an ink composition. Recording methods using an ink composition include, for example, an ink jet recording method, a recording method using writing utensils, such as pens, and other various recording methods. Particularly preferably, the ink composition according to the present invention is used in the ink jet recording method.

The ink composition according to the present invention basically comprises at least an alkali-soluble colorant, a water-soluble organic solvent, water, and a cationic water-soluble resin. In this case, the cationic water-soluble resin comprises repeating units (a) represented by formula (a) in formula (I) and repeating units (b1) represented by formula (b1) in formula (I) or repeating units (b2) represented by formula (b2) in formula (I).

The resin comprising units (a) and units (b1) will be hereinafter referred to as the "resin of the first embodiment," and the resin comprising units (a) and units (b2) will be hereinafter referred to as the "resin of the second embodiment."

Resin of First Embodiment

The ink composition comprising the resin of the first embodiment according to the present invention can realize images having no significant feathering or bleeding and, at the same time, having excellent waterfastness. Although the reason why this effect can be attained has not been fully elucidated yet, it is believed as follows. The cationic water-soluble resin of the first embodiment contained in the ink composition according to the present invention is stably in the state of dissolution in the ink composition. Upon the deposition of this ink onto a recording medium, the cationic water-soluble resin causes electrostatic interaction with the colorant. This resin also interacts with the recording medium and thus can be stably fixed onto the recording medium. The fixation of the resin onto the recording medium is considered to permit the colorant, together with the resin, to be fixed onto the recording medium, thereby imparting the waterfastness to printed images. In particular, even though the pH value of the recording medium is on alkaline side, good waterfastness can be realized. Further, it is considered that good fixation of the colorant onto the recording medium can realize images having no significant feathering or bleeding.

Further, the ink composition according to the present invention can realize images having excellent lightfastness. Although the reason why the ink composition can provide lightfast images has not been fully elucidated yet, it is considered that the copresence of repeating units having primary amino groups and repeating units having tertiary amino groups in an identical molecule can markedly reduce the acceleration of photodecomposition of prints caused by the primary amino groups. Specifically, the primary amino group has stronger electrostatic interaction with the colorant than the tertiary amino group. Therefore, use of the resin having only primary amino groups often accelerates photodecomposition of prints. That is, images yielded by an ink composition containing a resin having only the primary amino groups have poor lightfastness. On the other hand, the copresence of the primary amino group and the tertiary amino group in an identical molecule inhibits the electrostatic interaction of the primary amino group and can alleviate the acceleration of the photodecomposition. This is also estimated, for example, from the fact that, when an ink is prepared using a mixture of a resin having only primary amino groups with a resin having tertiary amino groups, photodecomposition of prints, obtained using this ink, caused by the primary amino group is not very alleviated.

Furthermore, the ink composition of the present invention can realize images having excellent waterfastness. An ink composition containing a resin having primary amino groups and an ink composition containing a resin having tertiary amino groups each have good storage stability and, in addition, can realize images having good waterfastness on acidic paper. Images yielded on neutral or alkaline paper by the ink composition containing the resin having tertiary amino groups have slightly poor waterfastness, while the ink composition containing the resin having primary amino groups can realize images having good waterfastness even on neutral or alkaline paper. The resin having both primary amino groups and tertiary amino groups in the same molecule as used in the present invention can provide an advantage that good waterfastness can be realized on acidic paper, as well as on neutral or alkaline paper. The present inventors have experimentally confirmed that this advantage cannot be offered by an ink composition containing a mere mixture of the resin having only primary amino groups with the resin having only tertiary amino groups.

In unit (a), $R_1$ and $R_2$ may be the same or different and each independently represent a $C_{1-5}$ alkyl group, preferably a $C_{1-5}$ alkyl group, more preferably a methyl group. Most preferably, $R_1$ and $R_2$ simultaneously represent a methyl group.

m and n are each 0, 1, or 2. Preferably, m and n are simultaneously 1.

According to a preferred embodiment of the present invention, the unit (a) to unit (b1) ratio is in the range of 1:4 to 4:1. Use of this cationic water-soluble resin can markedly alleviate the acceleration of photodecomposition of prints caused by the primary amino group and can retain good waterfastness.

Resin of Second Embodiment

The ink composition containing the resin of the second embodiment according to the present invention can realize images having no significant feathering or bleeding and, at the same time, having excellent waterfastness. Although the reason for this has not been fully elucidated yet, it is believed as follows. The cationic water-soluble resin of the second embodiment contained in the ink composition according to the present invention is stably in the state of dissolution in the ink composition. Upon the deposition of this ink onto a recording medium, the cationic water-soluble resin causes electrostatic interaction with the colorant. This resin also interacts with the recording medium and thus can be stably fixed onto the recording medium. The fixation of the resin onto the recording medium is considered to permit the colorant, together with the resin, to be fixed onto the recording medium, thereby imparting the waterfastness to printed images on various recording media. In particular, even when the pH of the recording medium is on neutral or alkaline side, good waterfastness can be realized. Further, it is considered that good fixation of the colorant onto the recording medium can realize images having no significant feathering or bleeding.

Resins comprising only units (b2) can realize good waterfastness on acidic paper, as well as on neutral or alkaline paper, but on the other hand, the lightfastness of printed images and the storage stability of the ink are somewhat poor. On the other hand, an ink composition containing a resin having tertiary amino groups can yield highly lightfast images and has excellent storage stability. As described above, however, images yielded on neutral or alkaline paper by this ink composition are somewhat poor in waterfastness. An ink composition containing a resin having tertiary amino groups and units (b2) in the same molecule can realize images having good waterfastness and lightfastness and, in addition, has excellent storage stability. The reason for this has not been fully elucidated yet. The present inventors, however, have experimentally confirmed the fact that this advantageous effect cannot be attained by an ink composition containing a mere mixture of a resin comprising only units (a) with a resin comprising only units (b2).

The ink composition according to the present invention can simultaneously realize good waterfastness on various recording media and good storage stability. Specifically, regarding the storage stability, any deposit is not created during storage for a long period of time. Although the reason for this has not been fully elucidated yet, this effect is considered attributable to the fact that the cationic water-soluble resin contains units (a) and units (b2) in the same molecule. The present inventors have experimentally confirmed that, unlike the ink composition of the present invention, an ink containing a mere mixture of a resin having only unsubstituted diallylamino groups with a resin having only dialkylallylamino groups cannot realize good waterfastness and storage stability.

In the cationic water-soluble resin used in the present invention, $R_1$, and $R_2$ may be the same or different and represent a $C_{1-5}$ alkyl group, preferably a $C_{1-3}$ alkyl group, more preferably a methyl group. $R_3$ represents a hydrogen atom or a $C_{1-5}$ alkyl group, preferably a $C_{1-3}$ alkyl group, more preferably a methyl group. Most preferably, $R_1$, $R_2$, and $R_3$ simultaneously represent a methyl group.

n is 0, 1, or 2, preferably 1.

The unit (a) to unit (b2) ratio in the resin is preferably 2:8 to 7:3. Use of this cationic water-soluble resin can offer higher level of ink storage stability and waterfastness on neutral or alkaline paper. These two types of repeating units (a) and (b2) may be present in a block or random form in the resin.

According to a preferred embodiment of the present invention, the weight average molecular weight of the cationic water-soluble resin is preferably about 250 to 20,000, more preferably about 400 to 10,000, most preferably 500 to 3,000.

According to a preferred embodiment of the present invention, the cationic water-soluble resin contained in the ink composition may contain structural units other than units (a) and units (b1) or units (b2). The presence of the third unit can improve various properties of the cationic water-soluble resin. Monomers for providing the third unit usable herein include propylene, isobutylene, styrene, vinyl chloride, vinylidene chloride, vinyl acetate, acrylic acid or acrylic esters (for example, lower alkyl esters), methacrylic acid or methacrylic esters (for example, lower alkyl esters), acrylonitrile, methyl vinyl ether, vinylpyrrolidone, or sulfur dioxide. The content of units derived from these monomers in the cationic water-soluble resin is not particularly limited. However, the ratio of the number of moles of the additional units to the total number of moles of the units (a) and (b1) or (b2) is preferably not more than 0.7, more preferably not more than 0.3. These additional units may be present in a block or random form in the cationic water-soluble resin.

According to a preferred embodiment of the present invention, the ink composition contains a water-soluble resin other than the cationic water-soluble resin. The additional water-soluble resin is preferably a nonionic water-soluble resin, and examples thereof include polyacrylamide, hydroxy esters of polymethacrylic acid, such as polyhydroxyethyl methacrylate, polyvinylpyrrolidone, polyvinyl alcohol, and polyethylene glycol. The addition of these water-soluble resin can further stabilize the ink composition.

Colorant and Solvent

The alkali-soluble colorant contained in the ink composition according to the present invention may be either a dye or a pigment. The term "alkali-soluble" used herein means that the colorant can be dissolved in an alkaline medium. The water-soluble group contained in the molecule may be an acidic or basic dissociative group or nondissociative functional group, or alternatively a plurality of kinds of these groups are present in the molecule. Alkali-soluble colorants may be soluble in acidic solutions so far as they are soluble in alkalis.

The content of the colorant may be properly determined. For example, the content of the colorant is preferably 0.5 to 20% by weight based on the total weight of the ink composition. This is because a colorant content falling within the above range can provide printed images having satisfactory optical density and permits the viscosity of the ink to be easily adjusted to a value suitable for ink jet recording.

More preferably, the colorant is selected from organic dyes or organic pigments. Use of organic dyes or organic pigments can offer high color density per weight and vivid colors.

Dyes are organic color materials soluble in water, and preferred dyes are those that fall into categories of acidic dyes, direct dyes, reactive dyes, soluble vat dyes, and food dyes according to the color index. Further, colorants, insoluble in neutral water, falling within categories of oil-soluble dyes and basic dyes according to the color index may also be used so far as they are soluble in aqueous alkali solutions.

On the other hand, pigments may be generally selected from those falling within categories of pigments according to the color index. Although pigments are generally regarded as water-insoluble organic color materials, some pigments are soluble in alkalis and may be used in the present invention.

Specific examples of dyes and pigments usable herein include:

yellow dyes and pigments, such as C.I. Acid Yellow 1, 3, 11, 17, 19, 23, 25, 29, 36, 38, 40, 42, 44, 49, 59, 61, 70, 72, 75, 76, 78, 79, 98, 99, 110, 111, 127, 131, 135, 142, 162, 164, and 165, C.I. Direct Yellow 1, 8, 11, 12, 24, 26, 27, 33, 39, 44, 50, 55, 58, 85, 86, 87, 88, 89, 98, 110, 132, 142, and 144, C.I. Reactive Yellow 1, 2, 3, 4, 6, 7, 11, 12, 13, 14, 15, 16, 17, 18, 22, 23, 24, 25, 26, 27, 37, and 42, C.I. Food Yellow 3 and 4, C.I. Solvent Yellow 15, 19, 21, 30, and 109, and C.I. Pigment Yellow 23;

red dyes and pigments, such as C.I. Acid Red 1, 6, 8, 9, 13, 14, 18, 26, 27, 32, 35, 37, 42, 51, 52, 57, 75, 77, 80, 82, 85, 87, 88, 89, 92, 94, 97, 106, 111, 114, 115, 117, 118, 119, 129, 130, 131, 133, 134, 138, 143, 145, 154, 155, 158, 168, 180, 183, 184, 186, 194, 198, 209, 211, 215, 219, 249, 252, 254, 262, 265, 274, 282, 289, 303, 317, 320, 321, and 322, C.I. Direct Red 1, 2, 4, 9, 11, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230, and 231, C.I. Reactive Red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 45, 46, 49, 50, 58, 59, 63, and 64, C.I. Solubilized Red 1, C.I. Food Red 7, 9, and 14, and C.I. Pigment Red 41, 48, 54, 57, 58, 63, 68, and 81;

blue dyes and pigments, such as C.I. Acid Blue 1, 7, 9, 15, 22, 23, 25, 27, 29, 40, 41, 43, 45, 54, 59, 60, 62, 72, 74, 78, 80, 82, 83, 90, 92, 93, 100, 102, 103, 104, 112, 113, 117, 120, 126, 127, 129, 130, 131, 138, 140, 142, 143, 151, 154, 158, 161, 166, 167, 168, 170, 171, 182, 183, 184, 187, 192, 199, 203, 204, 205, 229, 234, 236, and 249, C.I. Direct Blue 1, 2, 6, 15, 22, 25, 41, 71, 76, 77, 78, 80, 86, 87, 90, 98, 106, 108, 120, 123, 158, 160, 163, 165, 168, 192, 193, 194, 195, 196, 199, 200, 201, 202, 203, 207, 225, 226, 236, 237, 246, 248, and 249, C.I. Reactive Blue 1, 2, 3, 4, 5, 7, 8, 9, 13, 14, 15, 17, 18, 19, 20, 21, 25, 26, 27, 28, 29, 31, 32, 33, 34, 37, 38, 39, 40, 41, 43, 44, and 46, C.I. Solubilized Vat Blue 1, 5, and 41, C.I. Vat Blue 29, C.I. Food Blue 1 and 2, C.I. Basic Blue 9, 25, 28, 29, and 44, and C.I. Pigment Blue 1 and 17; and black dyes and pigments, such as C.I. Acid Black 1, 2, 7, 24, 26, 29, 31, 48, 50, 51, 52, 58, 60, 62, 63, 64, 67, 72, 76, 77, 94, 107, 108, 109, 110, 112, 115, 118, 119, 121, 122, 131, 132, 139, 140, 155, 156, 157, 158, 159, and 191, C.I. Direct Black 17, 19, 22, 32, 35, 38, 51, 56, 62, 71, 74, 75, 77, 94, 105, 106, 107, 108, 112, 113, 117, 118, 132, 133, 146, 154, 168, 171, and 195, C.I. Reactive Black 1, 3, 4, 5, 6, 8, 9, 10, 12, 13, 14, and 18, C.I. Solubilized Vat Black 1, and C.I. Food Black 2. These colorants may be used alone or as a mixture of two or more.

According to the ink composition of the present invention, water is a main solvent. Water may be pure water obtained by ion exchange, ultrafiltration, reverse osmosis, distillation or the like, or ultrapure water. Further, water, which has been sterilized by ultraviolet irradiation or by addition of hydrogen peroxide, is suitable because, when the ink composition is stored for a long period of time, it can prevent the growth of mold or bacteria.

The ink composition according to the present invention may contain a basic material. Examples of basic materials usable herein include: inorganic bases, such as sodium hydroxide, potassium hydroxide, lithium hydroxide, calcium hydroxide, barium hydroxide, strontium hydroxide, radium hydroxide, berylium hydroxide, magnesium hydroxide, and ammonia; mono-, di- or tri-lower alkylamines, such as ethylamine, diethylamine, triethylamine, propylamine, dipropylamine, diisopropylamine, tert-butylamine, dibutylamine, diisobutylamine, isopropylamine, sec-butylamine, and pentylamine; lower alkyl lower hydroxyalkoxyamines, such as 3-ethoxypropylamine and 3-methoxypropylamine; lower alkyl lower alkoxyamines, such as 3-ethoxypropylamine and 3-methoxypropylamine; mono-, di- or tri-lower hydroxyalkylamines, such as 2-aminoethanol, 2-(dimethylamino)ethanol, 2-(diethylamino)ethanol, diethanolamine, N-butyldiethanolamine, triethanolamine, aminomethylpropanol, and triisopropanolamine; and organic amines, such as iminobispropylamine, 3-diethylaminopropylamine, dibutylaminopropylamine, methylaminopropylamine, dimethylaminopropanediamine, and methyliminobispropylamine. These basic materials can function so that the cationic water-soluble resin and the colorant can be stably dissolved and held in the ink composition. For example, when an ink is prepared using the cationic water-soluble resin according to the present invention in combination with a specific colorant, mere mixing is often insufficient for dissolution of these ingredients in the ink. The addition of the basic material permit the resin and the colorant to be stably dissolved in the ink.

In the ink composition according to the present invention, the term "water-soluble organic solvent" refers to an aqueous medium which can dissolve solutes of the ink, such as a colorant. Preferably, the water-soluble organic solvent is selected from water-soluble solvents having a lower vapor pressure than water. Example thereof include: polyhydric alcohols, such as ethylene glycol, propylene glycol, butanediol, pentanediol, 2-butene-1,4-diol, 2-methyl-2,4-pentanediol, glycerin, 1,2,6-hexanetriol, diethylene glycol, and dipropylene glycol; ketones, such as acetonylacetone; γ-butyrolactone; esters, such as diacetin and triethyl phosphate; lower alkoxy lower alcohols, such as 2-methoxyethanol and 2-ethoxyethanol; and furfuryl alcohol, tetrahydrofurfuryl alcohol, and thiodiglycol. Water-soluble organic solvents usable herein include those which are liquid at room temperature, those which are solid at room temperature and, upon heat melting, can function as solvents, and those which, when used in combination with an aqueous solution or other solvent, can function as solvents. Since the vapor pressure of the organic solvent is lower than that of pure water, even though drying of the ink proceeds at the front end of an ink jet head, the proportion of the organic solvent in the ink is not lowered. As a result, the dissolving power of the organic solvent is not lowered, and the ink can be stably kept.

The amount of the water-soluble organic solvent may be properly determined. For example, the amount of the water-soluble organic solvent added is preferably 5 to 50% by weight based on the total amount of the ink.

According to a preferred embodiment of the present invention, the ink composition may further contain the following organic solvent. Specific examples of additional organic solvents usable herein include imidazole, methylimidazole, hydroxyimidazole, triazole, nicotinic amide, dimethylaminopyridine, ε-caprolactam, 1,3-dimethyl-2-imidazolidinone, lactic amide, sulfolane, dimethylsulfoxide, 1,3-propanesultone, methyl carbamate, ethyl carbamate, 1-methylol-5,5-dimethylhydantoin, hydroxyethylpiperazine, piperazine, ethyleneurea, propyleneurea, ethylene carbonate, propylene carbonate, N-methyl-2-pyrrolidinone, 2-pyrrolidinone, acetamide, formamide, dimethylformamide, N-methylformamide, dimethylacetamide, guanidine, guanidinoacetic acid, guanitidine, aminoguanidine, canavanine, argininosuccinic acid, arginine, biguanide, pyrazine, hexahydropyrazine, triazine, pyridazine, cytosine, 1,2,3-triazole, 1,2,4-triazole, pyrazole, tetrazole, thiazole, 1,2,3-thiadiazole, purine, guanine, guanosine, methylguanine, caffeine, and xanthine. The addition of these organic solvents can prevent, for example, precipitation even upon cooling of the ink and enables printing to be stably performed even under such environment.

If necessary, the ink composition according to the present invention may further comprise assistants commonly used in ink for ink jet recording. Examples of assistants usable herein include penetrants, viscosity modifiers, surface tension modifiers, hydrotropy agents, humectants, pH adjustors, antimolds, chelating agents, preservatives, and rust preventives. When the ink is used in an ink jet recording method utilizing electrification of the ink, a specific resistance modifier may be added which is selected from inorganic salts, such as lithium chloride, sodium chloride, and ammonium chloride.

Penetrants usable herein include: lower alcohols, such as ethanol, isopropanol, butanol, and pentanol; cellosolves, such as ethylene glycol monobutyl ether; carbitols, such as diethylene glycol monobutyl ether and triethylene glycol monobutyl ether; and surfactants. Surface tension modifiers usable herein include: alcohols, such as diethanolamine, triethanolamine, glycerin, and diethylene glycol; and nonionic, cationic, anionic, or amphoteric surfactants.

Preferred hydrotropy agents usable herein include urea, alkylureas, ethyleneurea, propyleneurea, thiourea, guanidine acid salts, and tetraalkylammonium halides.

Regarding the humectant, glycerin, diethylene glycol or the like may be added as an agent which serves also as the water-soluble organic solvent. Furthers, saccharides, such as maltitol, sorbitol, gluconic lactone, maltose and the like may be added.

Regarding the pH adjustor, the basic material described above may be added as a pH adjustor which serves also as the basic material.

Ink Set

As described above, the ink composition according to the present invention contains a cationic water-soluble resin. On the other hand, according to another aspect of the present invention, there is provided an ink set comprising at least a black ink, a yellow ink, a cyan ink, and a magenta ink. These inks are ink compositions according to the present invention. In this case, the black ink contains as the colorant a member selected from the group consisting of C.I. Direct Black 19, 35, 154, 168, 171, and 195 and C.I. Food Black 2; the yellow ink contains as the colorant a member selected from the group consisting of C.I. Direct Yellow 50, 55, 86, 132, 142, and 144 and C.I. Acid Yellow 23; the cyan ink contains as the colorant a member selected from the group consisting of C.I. Direct Blue 86, 87, and 199 and C.I. Acid Blue 9 and 249; and the magenta ink contains as the colorant a member selected from the group consisting of C.I. Direct Red 9 and 227, C.I. Acid Red 52 and 289, and dyes represented by formula (II):

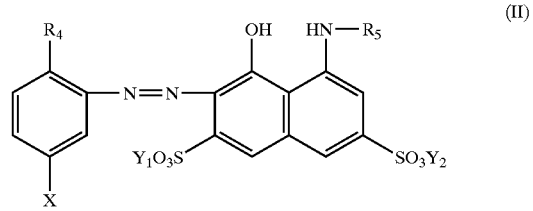

wherein $R_4$ and $R_5$ each represent a hydrogen atom, a $C_{1-5}$ alkyl group, an aryl group, a $C_{1-5}$ alkoxy group, a phenoxy group or a derivative thereof, a triazine ring or a derivative thereof, a carboxyl group or a salt thereof, or a sulfonyl group or a derivative thereof;

X represents a hydrogen atom or a halogen atom; and $Y_1$ and $Y_2$, which may be the same or different, each represent an alkali metal atom, ammonium, or a $C_{1-5}$ alkylammonium.

Use of this ink set can realize the formation of full-color images having excellent waterfastness on various recording media. Although the reason for this has not been fully elucidated yet, the excellent waterfastness is believed to derive from strong electrostatic interaction between the above group of dyes and the cationic water-soluble resin.

Among a group of dyes represented by formula (II), a dye represented by formula (III) is preferred. This dye falls into the category of C.I. Acid Red 249 according to the color index.

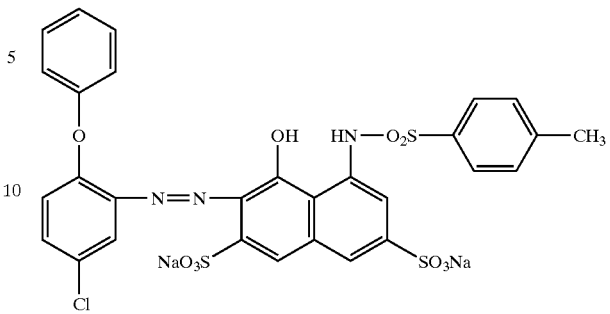

Further, among the dyes represented by formula (II), a dye represented by formula (IV) is also preferred.

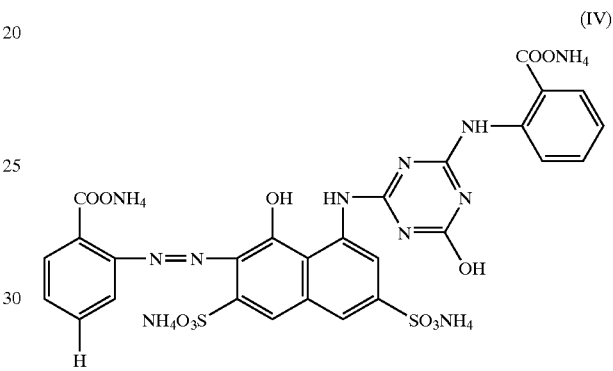

Use of the ink composition according to the present invention in combination with the ink composition containing an anionic material can realize images having no significant color-to-color bleeding between two inks. It is considered that, upon contact of the two ink compositions on a recording medium, the cationic water-soluble resin in the ink composition according to the present invention is reacted with the anionic material to create a precipitate which can inhibit further spreading of the ink composition on the recording medium, resulting in the realization of printed images having no significant color-to-color bleeding.

Therefore, according to a further aspect of the present invention, there is provided an ink set comprising: the ink composition according to the present invention as a first ink composition; and an anionic material-containing ink composition as a second ink composition.

The ink set generally comprises a yellow ink, a magenta ink, a cyan ink, and a black ink. According to a preferred embodiment of the present invention, the ink compositions according to the present invention are used as the yellow ink, the magenta ink, and the cyan ink with an ink composition containing an anionic material being used as the black ink, or alternatively, the ink composition according to the present invention is used as the black ink with anionic material-containing ink compositions being used as the yellow ink, the magenta ink, and the cyan ink.

In this case, the second ink composition, that is, the anionic material-containing composition basically comprises a colorant, a water-soluble organic solvent, water, an anionic material, and a basic material.

According to a preferred embodiment of the present invention, the anionic material may be an anionic resin. Examples of preferred anionic resins include those which have anionic functional groups, such as sulfonic acid, carboxyl, phosphoric acid, or hydroxyl groups, and, together with the basic material, form a water-soluble salt. Specific examples thereof include: cellulose derivatives, such as carboxymethylcellulose and viscose; naturally occurring polymeric materials, such as alginic acid, gum arabic, tragacanth, and lignin sulfonic acid; starch derivatives, such as phosphorylated starch and carboxymethyl starch salt; and synthetic polymers, such as polyacrylic acid, polymethacrylic acid, polyvinylsulfuric acid, polyvinylsulfonic acid, condensed naphthalenesulfonic acid, ethylene/acrylic acid copolymer, styrene/acrylic acid copolymer, styrene/methacrylic acid copolymer, acrylic ester/acrylic acid copolymer, acrylic ester/methacrylic acid copolymer, methacrylic ester/acrylic acid copolymer, methacrylic ester/methacrylic acid copolymer, styrene/itaconic acid copolymer, itaconic ester/itaconic acid copolymer, vinylnaphthalene/acrylic acid copolymer, vinylnaphthalene/methacrylic acid copolymer, vinylnaphthalene/itaconic acid copolymer, phenolic resin, and copolymers thereof.

According to the present invention, the colorant used in the second ink composition may be a pigment dispersed in the anionic resin.

According to another preferred embodiment of the present invention, the anionic material is a pigment having on its surface an anionic functional group. The formation of a salt of the anionic group with the basic material enables pigment particles to be dispersed in water. Anionic functional groups usable herein include, for example, sulfonic acid, carboxyl, and phosphoric acid groups. The pigment having on its surface an anionic functional group may be obtained by grafting the functional group onto the surface of the pigment. Further, the pigment may be a commercially available one, and preferred examples thereof include Microjet CW-1 and Microjet CW-2 (tradename; manufactured by Orient Chemical Industries, Ltd.).

Examples of basic materials usable herein include those recited above as usable in the ink composition of the present invention.

In the anionic material-containing ink composition constituting the ink set according to the present invention, the other ingredients may be fundamentally the same as those constituting the ink composition of the present invention, except that the cationic water-soluble resin is omitted therefrom.

EXAMPLES

In the following description, "%", is by weight unless otherwise specified. The weight average molecular weight of the resin is expressed in terms of free type.

In the following Example A, cationic resins according to the first embodiment were used.

Example A1

Preparation of Cationic Water-Soluble Resin A1

A cationic water-soluble resin A1 (hydrochloride type) was obtained using the materials and method as described in Japanese Patent Laid-Open No. 320546/1997. For the cationic water-soluble resin A1 (hydrochloride type) thus obtained, the weight average molecular weight was 700, and, in formula (I), m and n were each 1, $R_1$ and $R_2$ each represented a methyl group, and unit (a): unit (b1)=4:1. A 15% aqueous solution of this resin was provided, and the acid portion of the resin was removed by an ion exchange resin (IRA 900, manufactured by Organo Corp.) which had been previously ion-exchanged with sodium hydroxide. Thus, a cationic water-soluble resin A1 (free type) was obtained.

Example A2

Preparation of Cationic Water-Soluble Resin A2

The same procedure of Example A1 was repeated to obtain a cationic water-soluble resin A2 (hydrochloride type) wherein the weight average molecular weight was 2,000, m and n were each 1, $R_1$ and $R_2$ each represented a methyl group, and unit (a): unit (b1)=4:1. A 15% aqueous solution of this resin was provided, and the acid portion of the resin was removed by an ion exchange resin (IRA 900, manufactured by Organo Corp.) which had been previously ion-exchanged with sodium hydroxide. Thus, a cationic water-soluble resin A2 (free type) was obtained.

Example A3

Preparation of Cationic Water-Soluble Resin A3

The same procedure of Example A1 was repeated to obtain a cationic water-soluble resin A3 (hydrochloride type) wherein the weight average molecular weight was 7,500, m and n were each 1, $R_1$ and $R_2$ each represented a methyl group, and unit (a): unit (b1)=4:1. A 15% aqueous solution of this resin was provided, and the acid portion of the resin was removed by an ion exchange resin (IRA 900, manufactured by Organo Corp.) which had been previously ion-exchanged with sodium hydroxide. Thus, a cationic water-soluble resin A3 (free type) was obtained.

Example A4

Preparation of Cationic Water-Soluble Resin A4

The same procedure of Example A1 was repeated to obtain a cationic water-soluble resin A4 (hydrochloride type) wherein the weight average molecular weight was 15,000, m and n were each 1, $R_1$ and $R_2$ each represented a methyl group, and unit (a): unit (b1)=4:1. A 15% aqueous solution of this resin was provided, and the acid portion of the resin was removed by an ion exchange resin (IRA 900, manufactured by Organo Corp.) which had been previously ion-exchanged with sodium hydroxide. Thus, a cationic water-soluble resin A4 (free type) was obtained.

Example A5

Preparation of Cationic Water-Soluble Resin A5

The same procedure of Example A1 was repeated to obtain a cationic water-soluble resin A5 (hydrochloride type) wherein the weight average molecular weight was 500, m and n were each 1, $R_1$ and $R_2$ each represented a methyl group, and unit (a): unit (b1)=3:1. A 15% aqueous solution of this resin was provided, and the acid portion of the resin was removed by an ion exchange resin (IRA 900, manufactured by Organo Corp.) which had been previously ion-exchanged with sodium hydroxide. Thus, a cationic water-soluble resin A5 (free type) was obtained.

Example A6

Preparation of Cationic Water-Soluble Resin A6

The same procedure of Example A1 was repeated to obtain a cationic water-soluble resin A6 (hydrochloride type) wherein the weight average molecular weight was 5,000, m and n were each 1, $R_1$ and $R_2$ each represented a methyl group, and unit (a): unit (b1)=3:1. A 15% aqueous solution of this resin was provided, and the acid portion of the resin was removed by an ion exchange resin (IRA 900, manufactured by Organo Corp.) which had been previously ion-exchanged with sodium hydroxide. Thus, a cationic water-soluble resin A6 (free type) was obtained.

Example A7

Preparation of Cationic Water-Soluble Resin A7

The same procedure of Example A1 was repeated to obtain a cationic water-soluble resin A7 (hydrochloride type) wherein the weight average molecular weight was 10,300, m and n were each 1, $R_1$ and $R_2$ each represented a methyl group, and unit (a): unit (b1)=3:1. A 15% aqueous solution of this resin was provided, and the acid portion of the resin was removed by an ion exchange resin (IRA 900, manufactured by Organo Corp.) which had been previously ion-exchanged with sodium hydroxide. Thus, a cationic water-soluble resin A7 (free type) was obtained.

Example A8

Preparation of Cationic Water-Soluble Resin A8

The same procedure of Example A1 was repeated to obtain a cationic water-soluble resin A8 (hydrochloride type) wherein the weight average molecular weight was 1,200, m and n were each 1, $R_1$ and $R_2$ each represented a methyl group, and unit (a): unit (b1)=2:1. A 15% aqueous solution of this resin was provided, and the acid portion of the resin was removed by an ion exchange resin (IRA 900, manufactured by Organo Corp.) which had been previously ion-exchanged with sodium hydroxide. Thus, a cationic water-soluble resin A8 (free type) was obtained.

Example A9

Preparation of Cationic Water-Soluble Resin A9

The same procedure of Example A1 was repeated to obtain a cationic water-soluble resin A9 (hydrochloride type) wherein the weight average molecular weight was 2,800, m and n were each 1, $R_1$ and $R_2$ each represented a methyl group, and unit (a): unit (b1)=2:1. A 15% aqueous solution of this resin was provided, and the acid portion of the resin was removed by an ion exchange resin (IRA 900, manufactured by Organo Corp.) which had been previously ion-exchanged with sodium hydroxide. Thus, a cationic water-soluble resin A9 (free type) was obtained.

Example A10

Preparation of Cationic Water-Soluble Resin A10

The same procedure of Example A1 was repeated to obtain a cationic water-soluble resin A10 (hydrochloride type) wherein the weight average molecular weight was 1,000, m and n were each 1, $R_1$ and $R_2$ each represented a methyl group, and unit (a): unit (b1)=3:2. A 15% aqueous solution of this resin was provided, and the acid portion of the resin was removed by an ion exchange resin (IRA 900, manufactured by Organo Corp.) which had been previously ion-exchanged with sodium hydroxide. Thus, a cationic water-soluble resin A10 (free type) was obtained.

Example A11

Preparation of Cationic Water-Soluble Resin A11

The same procedure of Example A1 was repeated to obtain a cationic water-soluble resin A11 (hydrochloride type) wherein the weight average molecular weight was 3,000, m and n were each 1, $R_1$ and $R_2$ each represented a methyl group, and unit (a): unit (b1)=3:2. A 15% aqueous solution of this resin was provided, and the acid portion of the resin was removed by an ion exchange resin (IRA 900, manufactured by Organo Corp.) which had been previously ion-exchanged with sodium hydroxide. Thus, a cationic water-soluble resin A11 (free type) was obtained.

Example A12

Preparation of Cationic Water-Soluble Resin A12

The same procedure of Example A1 was repeated to obtain a cationic water-soluble resin A12 (hydrochloride type) wherein the weight average molecular weight was 18,000, m and n were each 1, $R_1$ and $R_2$ each represented a methyl group, and unit (a): unit (b1)=3:2. A 15% aqueous solution of this resin was provided, and the acid portion of the resin was removed by an ion exchange resin (IRA 900, manufactured by Organo Corp.) which had been previously ion-exchanged with sodium hydroxide. Thus, a cationic water-soluble resin A12 (free type) was obtained.

Example A13

Preparation of Cationic Water-Soluble Resin A13

The same procedure of Example A1 was repeated to obtain a cationic water-soluble resin A13 (hydrochloride type) wherein the weight average molecular weight was 800, m and n were each 1, $R_1$ and $R_2$ each represented a methyl group, and unit (a): unit (b1)=1:1. A 15% aqueous solution of this resin was provided, and the acid portion of the resin was removed by an ion exchange resin (IRA 900, manufactured by Organo Corp.) which had been previously ion-exchanged with sodium hydroxide. Thus, a cationic water-soluble resin A13 (free type) was obtained.

Example A14

Preparation of Cationic Water-Soluble Resin A14

The same procedure of Example A1 was repeated to obtain a cationic water-soluble resin A14 (hydrochloride type) wherein the weight average molecular weight was 2,500, m and n were each 1, $R_1$ and $R_2$ each represented a methyl group, and unit (a): unit (b1)=1:1. A 15% aqueous solution of this resin was provided, and the acid portion of the resin was removed by an ion exchange resin (IRA 900, manufactured by Organo Corp.) which had been previously ion-exchanged with sodium hydroxide. Thus, a cationic water-soluble resin A14 (free type) was obtained.

Example A15

Preparation of Cationic Water-Soluble Resin A15

The same procedure of Example A1 was repeated to obtain a cationic water-soluble resin A15 (hydrochloride type) wherein the weight average molecular weight was 8,400, m and n were each 1, $R_1$ and $R_2$ each represented a methyl group, and unit (a): unit (b1)=1:1. A 15% aqueous solution of this resin was provided, and the acid portion of the resin was removed by an ion exchange resin (IRA 900, manufactured by Organo Corp.) which had been previously ion-exchanged with sodium hydroxide. Thus, a cationic water-soluble resin A15 (free type) was obtained.

Example A16

Preparation of Cationic Water-Soluble Resin A16

The same procedure of Example A1 was repeated to obtain a cationic water-soluble resin A16 (hydrochloride type) wherein the weight average molecular weight was 20,000, m and n were each 1, $R_1$ and $R_2$ each represented a methyl group, and unit (a): unit (b1)=1:1. A 15% aqueous solution of this resin was provided, and the acid portion of the resin was removed by an ion exchange resin (IRA 900, manufactured by Organo Corp.) which had been previously ion-exchanged with sodium hydroxide. Thus, a cationic water-soluble resin A16 (free type) was obtained.

Example A17

Preparation of Cationic Water-Soluble Resin A17

The same procedure of Example A1 was repeated to obtain a cationic water-soluble resin A17 (hydrochloride type) wherein the weight average molecular weight was 400, m and n were each 1, $R_1$ and $R_2$ each represented a methyl group, and unit (a): unit (b1)=2:3. A 15% aqueous solution of this resin was provided, and the acid portion of the resin was removed by an ion exchange resin (IRA 900, manufactured by Organo Corp.) which had been previously ion-exchanged with sodium hydroxide. Thus, a cationic water-soluble resin A17 (free type) was obtained.

Example A18

Preparation of Cationic Water-Soluble Resin A18

The same procedure of Example A1 was repeated to obtain a cationic water-soluble resin A18 (hydrochloride type) wherein the weight average molecular weight was 6,300, m and n were each 1, $R_1$ and $R_2$ each represented a methyl group, and unit (a): unit (b1)=2:3. A 15% aqueous solution of this resin was provided, and the acid portion of the resin was removed by an ion exchange resin (IRA 900, manufactured by Organo Corp.) which had been previously ion-exchanged with sodium hydroxide. Thus, a cationic water-soluble resin A18 (free type) was obtained.

Example A19

Preparation of Cationic Water-Soluble Resin A19

The same procedure of Example A1 was repeated to obtain a cationic water-soluble resin A19 (hydrochloride type) wherein the weight average molecular weight was 600, m and n were each 1, $R_1$ and $R_2$ each represented a methyl group, and unit (a): unit (b1)=1:2. A 15% aqueous solution of this resin was provided, and the acid portion of the resin was removed by an ion exchange resin (IRA 900, manufactured by Organo Corp.) which had been previously ion-exchanged with sodium hydroxide. Thus, a cationic water-soluble resin A19 (free type) was obtained.

Example A20

Preparation of Cationic Water-Soluble Resin A20

The same procedure of Example A1 was repeated to obtain a cationic water-soluble resin A20 (hydrochloride type) wherein the weight average molecular weight was 7,100, m and n were each 1, $R_1$ and $R_2$ each represented a methyl group, and unit (a): unit (b1)=1:2. A 15% aqueous solution of this resin was provided, and the acid portion of the resin was removed by an ion exchange resin (IRA 900, manufactured by Organo Corp.) which had been previously ion-exchanged with sodium hydroxide. Thus, a cationic water-soluble resin A20 (free type) was obtained.

Example A21

Preparation of Cationic Water-Soluble Resin A21

The same procedure of Example A1 was repeated to obtain a cationic water-soluble resin A21 (hydrochloride type) wherein the weight average molecular weight was 900, m and n were each 1, $R_1$ and $R_2$ each represented a methyl group, and unit (a): unit (b1)=1:3. A 15% aqueous solution of this resin was provided, and the acid portion of the resin was removed by an ion exchange resin (IRA 900, manufactured by Organo Corp.) which had been previously ion-exchanged with sodium hydroxide. Thus, a cationic water-soluble resin A21 (free type) was obtained.

Example A22

Preparation of Cationic Water-Soluble Resin A22

The same procedure of Example A1 was repeated to obtain a cationic water-soluble resin A22 (hydrochloride type) wherein the weight average molecular weight was 4,200, m and n were each 1, $R_1$ and $R_2$ each represented a methyl group, and unit (a): unit (b1)=1:3. A 15% aqueous solution of this resin was provided, and the acid portion of the resin was removed by an ion exchange resin (IRA 900, manufactured by Organo Corp.) which had been previously ion-exchanged with sodium hydroxide. Thus, a cationic water-soluble resin A22 (free type) was obtained.

Example A23

Preparation of Cationic Water-Soluble Resin A23

The same procedure of Example A1 was repeated to obtain a cationic water-soluble resin A23 (hydrochloride type) wherein the weight average molecular weight was 250, m and n were each 1, $R_1$ and $R_2$ each represented a methyl group, and unit (a): unit (b1)=1:4. A 15% aqueous solution of this resin was provided, and the acid portion of the resin was removed by an ion exchange resin (IRA 900, manufactured by Organo Corp.) which had been previously ion-exchanged with sodium hydroxide. Thus, a cationic water-soluble resin A23 (free type) was obtained.

Example A24

Preparation of Cationic Water-Soluble Resin A24

The same procedure of Example A1 was repeated to obtain a cationic water-soluble resin A24 (hydrochloride type) wherein the weight average molecular weight was 13,000, m and n were each 1, $R_1$ and $R_2$ each represented a methyl group, and unit (a): unit (b1)=1:4. A 15% aqueous solution of this resin was provided, and the acid portion of the resin was removed by an ion exchange resin (IRA 900, manufactured by Organo Corp.) which had been previously ion-exchanged with sodium hydroxide. Thus, a cationic water-soluble resin A24 (free type) was obtained.

Example A25

Color Ink Set A1

To 15 g of a 15% aqueous solution of the cationic water-soluble resin A3 (free type) prepared in Example A3 were added 3 g of C.I. Acid Yellow 23, 8 g of glycerin, and 10 g of diethylene glycol monobutyl ether. Further, ultrapure water was added to bring the total solution amount to 100 g. Thus, a yellow ink A1 was obtained.

A magenta ink A1 and a cyan ink A1 were obtained in the same manner as used in the preparation of the yellow ink A1, except that, in the case of the magenta ink A1, 2 g of C.I. Acid Red 13 was used as the dye and, in the case of the cyan ink A1, 2 g of C.I. Acid Blue 9 was used as the dye.

These three inks are combined for use as a color ink set A1.

Example A26

Color Ink Set A2

To 30 g of a 15% aqueous solution of the cationic water-soluble resin A6 (free type) prepared in Example A6 were added 3.5 g of C.I. Acid Yellow 17, 3 g of diethylene glycol, and 7 g of triethylene glycol monobutyl ether. Further, ultrapure water was added to bring the total solution amount to 100 g. Thus, a yellow ink A2 was obtained.

A magenta ink A2 and a cyan ink A2 were obtained in the same manner as used in the preparation of the yellow ink A2, except that, in the case of the magenta ink A2, 3.5 g of C.I. Acid Red 1 was used as the dye and, in the case of the cyan ink A2, 3.5 g of C.I. Direct Blue 86 was used as the dye.

These three inks are combined for use as a color ink set A2.

Example A27

Color Ink Set A3

To 25 g of a 15% aqueous solution of the cationic water-soluble resin A8 (free type) prepared in Example A8 were added 2 g of Daiwa IJ Yellow 214HL (tradename; manufactured by Daiwa Dye Stuff Mfg. Co., Ltd., C.I. Direct Yellow 86), 5 g of thioglycol, 5 g of diethylene glycol monobutyl ether, 15 g of N-methylimidazole, and 1 g of Surfynol 465 (tradename; manufactured by Air Products and Chemicals, Inc.). Further, ultrapure water was added to bring the total solution amount to 100 g. Thus, a yellow ink A3 was obtained.

A magenta ink A3 and a cyan ink A3 were obtained in the same manner as used in the preparation of the yellow ink A3, except that, in the case of the magenta ink A3, 6 g of Palatine Fast Pink-BNI was used as the dye and, in the case of the cyan ink A3, 3 g of C.I. Direct Blue 199 was used as the dye.

These three inks are combined for use as a color ink set A3.

Example A28

Color Ink Set A4

A yellow ink A4, a magenta ink A4, and a cyan ink A4 were prepared in the same manner as in Example A25, except that the 15% aqueous solution of the cationic water-soluble resin in Example A25 was changed to 10 g of a 15% aqueous solution of the cationic water-soluble resin A16 (free type) prepared in Example A16 and glycerin was changed to maltitol.

These three inks are combined for use as a color ink set A4.

Example A29

Color Ink Set A5

MY 123 (tradename; manufactured by Arimoto Chemical Company Ltd.) (3 g) was dissolved in 35 g of a 15% aqueous solution of the cationic water-soluble resin A18 (free type) prepared in Example A18. Thus, an aqueous cationic water-soluble resin A-dye solution was prepared. To this aqueous solution were added 10 g of thiodiglycol and 10 g of diethylene glycol monoethyl ether. Further, ultrapure water was added to bring the total solution amount to 100 g. Thus, a yellow ink A5 was obtained.

A magenta ink A5 and a cyan ink A5 were obtained in the same manner as used in the preparation of the yellow ink A5, except that, in the case of the magenta ink A5, 3.2 g of Savinyl Pink 6BLS (tradename; manufactured by Clariant Japan K.K.) was used as the dye and, in the case of the cyan ink A5, 3 g of Valifast Blue 1605 was used as the dye.

These three inks are combined for use as a color ink set A5.

Example A30

Color Ink Set A6

A yellow ink A6, a magenta ink A6, and a cyan ink A6 were prepared in the same manner as in Example A26, except that the 15% aqueous solution of the cationic water-soluble resin in Example A26 was changed to 40 g of a 15% aqueous solution of the cationic water-soluble resin A19 (free type) prepared in Example A19.

These three inks are combined for use as a color ink set A6.

Example A31

Color Ink Set A7

A yellow ink A7, a magenta ink A7, and a cyan ink A7 were prepared in the same manner as in Example A27, except that the 15% aqueous solution of the cationic water-soluble resin in Example A27 was changed to 15 g of a 15% aqueous solution of the cationic water-soluble resin A22 (hydrochloride type) prepared in Example A22 and, in addition, 1 g of potassium hydroxide was added.

These three inks are combined for use as a color ink set A7.

Example A32

Color Ink Set A8

A yellow ink A8, a magenta ink A8, and a cyan ink A8 were prepared in the same manner as in Example A29, except that the 15% aqueous solution of the cationic water-soluble resin in Example A29 was changed to 35 g of a 15% aqueous solution of the cationic water-soluble resin A10 (free type) prepared in Example A10.

These three inks are combined for use as a color ink set A8.

Example A33

Color Ink Set A9

A yellow ink A9, a magenta ink A9, and a cyan ink A9 were prepared in the same manner as in Example A27, except that the 15% aqueous solution of the cationic water-soluble resin in Example A27 was changed to 50 g of a 15% aqueous solution of the cationic water-soluble resin A1 (hydrochloride type) prepared in Example A1 and, in addition, 5 g of 2-(dimethylamino)ethanol was added.

These three inks are combined for use as a color ink set A9.

Example A34

Color Ink Set A10

A yellow ink A10, a magenta ink A10, and a cyan ink A10 were prepared in the same manner as in Example A29, except that the 15% aqueous solution of the cationic water-soluble resin in Example A29 was changed to 4 g of a 15% aqueous solution of the cationic water-soluble resin A14 (free type) prepared in Example A14 and, in addition, 0.1 g of sodium hydroxide was added.

These three inks are combined for use as a color ink set A10.

Example A35

Black Ink A1 and Color Ink Set A11

The cationic water-soluble resin A13 (hydrochloride type) prepared in Example A13 was provided. A 15% aqueous solution of this resin (20 g) was mixed with 6 g of C.I. Direct Black 195, 0.7 g of potassium hydroxide, 10 g of glycerin, 10 g of diethylene glycol monobutyl ether, and 0.8 g of a nonionic surfactant Surfynol 465. Further, ultrapure water was added to bring the total solution amount to 100 g. Thus, a black ink A1 was obtained.

A yellow ink A11, a magenta ink A11, and a cyan ink A11 were prepared in the same manner as used in the preparation of the black ink A1, except that, in the case of the yellow ink A11, 2.5 g of C.I. Direct Yellow 132 was used as the dye; in the case of the magenta ink A11, 2 g of C.I. Acid Red 249 was used as the dye; and in the case of the cyan ink A11, 4 g of C.I. Direct Blue 199 was used as the dye. These three inks A are combined for use as a color ink set A11.

Example A36

Black Ink A2 and Color Ink Set A12

The cationic water-soluble resin A23 (free type) prepared in Example A23 was provided. A 15% aqueous solution of this resin (40 g) was mixed with 10 g of C.I. Food Black 2, 0.2 g of potassium hydroxide, 15 g of glycerin, 10 g of triethylene glycol monobutyl ether, 5 g of diethylene glycol, and 1 g of a nonionic surfactant Surfynol 465. Further, ultrapure water was added to bring the total solution amount to 100 g. Thus, a black ink A2 was obtained.

A yellow ink A12, a magenta ink A12, and a cyan ink A12 were prepared in the same manner as used in the preparation of the black ink A2, except that, in the case of the yellow ink A12, 5 g of C.I. Acid Yellow 23 was used as the dye; in the case of the magenta ink A12, 2.5 g of a dye represented by formula (IV) was used as the dye; and in the case of the cyan ink A12, 4 g of C.I. Direct Blue 87 was used as the dye. These three inks A are combined for use as a color ink set A12.

Example A37

Black Ink A3

A styrene/acrylic acid copolymer (tradename: Joncryl 679, Mw 7,000, acid value 200, manufactured by Johnson Polymer Corp.) (8 g) was added to an aqueous solution of 22 g of triethanolamine and 1.7 g of potassium hydroxide in 1,200 g ultrapure water, followed by dissolution with stirring at 70° C. Furnace black as carbon black (50 g) was added as a colorant to the mixture. After premixing, dispersion was carried out by means of Eiger Mill for 10 hr to prepare a dispersion. In this case, zirconia was used as a dispersion ball. Glycerin (120 g) was added to the dispersion to obtain a black ink A3. The average particle diameter of carbon black in the ink was 160 nm.

Example A38

Black Ink A4

An alkali-reactive group-treated carbon black (tradename: Microjet CW-1, manufactured by Orient Chemical Industries Ltd.) (100 g) was added to 400 g of ultrapure water with stirring to prepare a dispersion. Carbon black, glycerin, triethylene glycol monobutyl ether, Surfynol 465, and 2-dimethylaminoethanol were added to the dispersion so that the final ink composition comprised 8% of carbon black, 10% of glycerin, 10% of triethylene glycol monobutyl ether, 1% of Surfynol 465, and 1% of 2-dimethylaminoethanol with the balance consisting of water. Thus, a black ink A4 was obtained. The average particle diameter of carbon black in the ink was 75 nm.

Comparative Example A1

Color Ink Set A13

A yellow ink A13, a magenta ink A13, and a cyan ink A 13 were prepared in the same manner as in Example A 25, except that the cationic water-soluble resin A3 (free type) was not used. These three inks are combined for use as a color ink set A13.

Comparative Example A2

Color Ink Set A14

A yellow ink A14, a magenta ink A14, and a cyan ink A 14 were prepared in the same manner as in Example A 25, except that the cationic water-soluble resin A3 (free type) was changed to SP-200 (tradename; polyethyleneimine, manufactured by Nippon Shokubai Kagaku Kogyo Co., Ltd.). These three inks are combined for use as a color ink set A14.

Comparative Example A3

Color Ink Set A15

A yellow ink A15, a magenta ink A15, and a cyan ink A 15 were prepared in the same manner as in Example A 25, except that the cationic water-soluble resin A3 (free type) was changed to PAA-L (tradename; free-type polyallylamine, weight average molecular weight 10,000, manufactured by Nippon Shokubai Kagaku Kogyo Co., Ltd.). These three inks are combined for use as a color ink set A15.

In the following Example B, cationic resins according to the second embodiment were used.

Example B1

Preparation of Cationic Water-Soluble Resin B1

A cationic water-soluble resin B1 (hydrochloride type) was obtained using the materials and method as described in Japanese Patent Laid-Open No. 352007/1997. For the cationic water-soluble resin B1 (hydrochloride type) thus obtained, the weight average molecular weight was 1,400, and, n was 1, $R_1$, $R_2$, and $R_3$ each represented a methyl group, and unit (a): unit (b2)=7:3. A 15% aqueous solution of this resin was provided, and the acid portion of the resin was removed by an ion exchange resin (IRA 900, manufactured by Organo Corp.) which had been previously ion-exchanged with sodium hydroxide. Thus, a cationic water-soluble resin B1 (free type) was obtained.

Example B2

Preparation of Cationic Water-Soluble Resin B2

The same procedure of Example B1 was repeated to obtain a cationic water-soluble resin B2 (hydrochloride type) wherein the weight average molecular weight was 2,400, n was 1, $R_1$, $R_2$, and $R_3$ each represented a methyl group, and unit (a): unit (b2)=7:3. A 15% aqueous solution of this resin was provided, and the acid portion of the resin was removed by an ion exchange resin (IRA 900, manufactured by Organo Corp.) which had been previously ion-exchanged with sodium hydroxide. Thus, a cationic water-soluble resin B2 (free type) was obtained.

Example B3

Preparation of Cationic Water-Soluble Resin B3

The same procedure of Example B1 was repeated to obtain a cationic water-soluble resin B3 (hydrochloride type) wherein the weight average molecular weight was 2,200, n was 1, $R_1$ and $R_2$ each represented a methyl group, $R_3$ represented a hydrogen atom, and unit (a): unit (b2)=6:4. A 15% aqueous solution of this resin was provided, and the acid portion of the resin was removed by an ion exchange resin (IRA 900, manufactured by Organo Corp.) which had been previously ion-exchanged with sodium hydroxide. Thus, a cationic water-soluble resin B3 (free type) was obtained.

Example B4

Preparation of Cationic Water-Soluble Resin B4

The same procedure of Example B1 was repeated to obtain a cationic water-soluble resin B4 (hydrochloride type) wherein the weight average molecular weight was 1,700, n was 1, $R_1$ and $R_2$ each represented a methyl group, $R_3$ represented a hydrogen atom, and unit (a): unit (b2)=4:6. A 15% aqueous solution of this resin was provided, and the acid portion of the resin was removed by an ion exchange resin (IRA 900, manufactured by Organo Corp.) which had been previously ion-exchanged with sodium hydroxide. Thus, a cationic water-soluble resin B4 (free type) was obtained.

Example B5

Preparation of Cationic Water-Soluble Resin B5

The same procedure of Example B1 was repeated to obtain a cationic water-soluble resin B5 (hydrochloride type) wherein the weight average molecular weight was 1,400, n was 1, $R_1$ and $R_2$ each represented a methyl group, $R_3$ represented a hydrogen atom, and unit (a): unit (b2)=3:7. A 15% aqueous solution of this resin was provided, and the acid portion of the resin was removed by an ion exchange resin (IRA 900, manufactured by Organo Corp.) which had been previously ion-exchanged with sodium hydroxide. Thus, a cationic water-soluble resin B5 (free type) was obtained.

Example B6

Preparation of Cationic Water-Soluble Resin B6

The same procedure of Example B1 was repeated to obtain a cationic water-soluble resin B6 (hydrochloride type) wherein the weight average molecular weight was 300, n was 1, $R_1$, $R_2$, and $R_3$ each represented a methyl group, and unit (a): unit (b2)=2:8. A 15% aqueous solution of this resin was provided, and the acid portion of the resin was removed by an ion exchange resin (IRA 900, manufactured by Organo Corp.) which had been previously ion-exchanged with sodium hydroxide. Thus, a cationic water-soluble resin B6 (free type) was obtained.

Example B7

Preparation of Cationic Water-Soluble Resin B7

The same procedure of Example 1 was repeated to obtain a cationic water-soluble resin B7 (hydrochloride type) wherein the weight average molecular weight was 18,000, n was 1, $R_1$, $R_2$, and $R_3$ each represented a methyl group, and unit (a): unit (b2)=3:7. A 15% aqueous solution of this resin was provided, and the acid portion of the resin was removed by an ion exchange resin (IRA 900, manufactured by Organo Corp.) which had been previously ion-exchanged with sodium hydroxide. Thus, a cationic water-soluble resin B7 (free type) was obtained.

Example B8

Preparation of Cationic Water-Soluble Resin B8

The same procedure of Example 13 was repeated to obtain a cationic water-soluble resin B8 (hydrochloride type) wherein the weight average molecular weight was 5,000, n was 1, $R_1$, $R_2$, and $R_3$ each represented a methyl group, and unit (a): unit (b2)=5:5. A 15% aqueous solution of this resin was provided, and the acid portion of the resin was removed by an ion exchange resin (IRA 900, manufactured by Organo Corp.) which had been previously ion-exchanged with sodium hydroxide. Thus, a cationic water-soluble resin B8 (free type) was obtained.

Example B9

Preparation of Color Ink Set B1

To 15 g of a 15% aqueous solution of the cationic water-soluble resin B1 (free type) prepared in Example B1 were added 3 g of C.I. Acid Yellow 23, 8 g of glycerin, and 10 g of diethylene glycol monobutyl ether. Further, ultrapure water was added to bring the total solution amount to 100 g. Thus, a yellow ink B1 was obtained.

A magenta ink B1 and a cyan ink B1 were obtained in the same manner as used in the preparation of the yellow ink B1, except that, in the case of the magenta ink B1, 2 g of C.I. Acid Red 13 was used as the dye and, in the case of the cyan ink B1, 2 g of C.I. Acid Blue 9 was used as the dye.

These three inks are combined for use as a color ink set B1.

Example B10

Preparation of Color Ink Set B2

To 30 g of a 15% aqueous solution of the cationic water-soluble resin B2 (free type) prepared in Example B2 were added 3.5 g of C.I. Acid Yellow 17, 3 g of diethylene glycol, and 7 g of triethylene glycol monobutyl ether. Further, ultrapure water was added to bring the total solution amount to 100 g. Thus, a yellow ink B2 was obtained.

A magenta ink B2 and a cyan ink B2 were obtained in the same manner as used in the preparation of the yellow ink B2, except that, in the case of the magenta ink B2, 3.5 g of C.I. Acid Red 1 was used as the dye and, in the case of the cyan ink B2, 3.5 g of C.I. Direct Blue 86 was used as the dye.

These three inks are combined for use as a color ink set B2.

Example B11

Preparation of Color Ink Set B3

To 25 g of a 15% aqueous solution of the cationic water-soluble resin B3 (free type) prepared in Example B3 were added 2 g of Daiwa IJ Yellow 214HL (tradename; manufactured by Daiwa Dye Stuff Mfg. Co., Ltd., C.I. Direct Yellow 86), 5 g of thioglycol, 5 g of diethylene glycol monobutyl ether, 15 g of N-methylimidazole, and 1 g of Surfynol 465 (tradename; manufactured by Air Products and Chemicals, Inc.). Further, ultrapure water was added to bring the total solution amount to 100 g. Thus, a yellow ink B3 was obtained.

A magenta ink B3 and a cyan ink B3 were obtained in the same manner as used in the preparation of the yellow ink B3, except that, in the case of the magenta ink B3, 6 g of Palatine Fast Pink-BNI was used as the dye and, in the case of the cyan ink B3, 3 g of C.I. Direct Blue 199 was used as the dye.

These three inks are combined for use as a color ink set B3.

Example B12

Preparation of Color Ink Set B4

A yellow ink B4, a magenta ink B4, and a cyan ink B4 were prepared in the same manner as in Example B9, except that the 15% aqueous solution of the cationic water-soluble resin in Example B9 was changed to 10 g of a 15% aqueous solution of the cationic water-soluble resin B4 (free type) prepared in Example B4 and glycerin was changed to maltitol.

These three inks are combined for use as a color ink set B4.

Example B13

Preparation of Color Ink Set B5

MY 123 (tradename; manufactured by Arimoto Chemical Company Ltd.) (3 g) was dissolved in 35 g of a 15% aqueous solution of the cationic water-soluble resin B5 (free type) prepared in Example B5. Thus, an aqueous cationic water-soluble resin B-dye solution was prepared. To this aqueous solution were added 10 g of thiodiglycol and 10 g of diethylene glycol monoethyl ether. Further, ultrapure water was added to bring the total solution amount to 100 g. Thus, a yellow ink B5 was obtained.

A magenta ink B5 and a cyan ink B5 were prepared in the same manner as used in the preparation of the yellow ink B5, except that, in the case of the magenta ink B5, 3.2 g of Savinyl Pink 6BLS (tradename; manufactured by Clariant Japan K. K.) was used as the dye and, in the case of the cyan ink B5, 3 g of Valifast Blue 1605 was used as the dye.

These three inks are combined for use as a color ink set B5.

Example B14

Preparation of Color Ink Set B6

A yellow ink B6, a magenta ink B6, and a cyan ink B6 were prepared in the same manner as in Example B10, except that the 15% aqueous solution of the cationic water-soluble resin in Example B10 was changed to 40 g of a 15% aqueous solution of the cationic water-soluble resin B6 (free type) prepared in Example B6.

These three inks are combined for use as a color ink set B6.

Example B15

Preparation of Color Ink Set B7

A yellow ink B7, a magenta ink B7, and a cyan ink B7 were prepared in the same manner as in Example B11, except that the 15% aqueous solution of the cationic water-soluble resin in Example B10 was changed to 5 g of a 15% aqueous solution of the cationic water-soluble resin B7 (hydrochloride type) prepared in Example B7 and, in addition, 1 g of potassium hydroxide was added.

These three inks are combined for use as a color ink set B7.

Example B16

Preparation of Color Ink Set B8

A yellow ink B8, a magenta ink B8, and a cyan ink B8 were prepared in the same manner as in Example B13, except that the 15% aqueous solution of the cationic water-soluble resin in Example B13 was changed to 50 g of a 15% aqueous solution of the cationic water-soluble resin B8 (free type) prepared in Example B8.

These three inks are combined for use as a color ink set B8.

Example B17

Preparation of Color Ink Set B9

A yellow ink B9, a magenta ink B9, and a cyan ink B9 were prepared in the same manner as in Example B11, except that the 15% aqueous solution of the cationic water-soluble resin in Example B11 was changed to 4 g of a 15% aqueous solution of the cationic water-soluble resin B7 (hydrochloride type) prepared in Example B7 and, in addition, 5 g of 2-(dimethylamino)ethanol was added.

These three inks are combined for use as a color ink set B9.

Example B18

Preparation of Color Ink Set B10

A yellow ink B10, a magenta ink B10, and a cyan ink B10 were prepared in the same manner as in Example B13, except that the 15% aqueous solution of the cationic water-soluble resin in Example B13 was changed to 10 g of a 15% aqueous solution of the cationic water-soluble resin B8 (free type) prepared in Example B8 and, in addition, 0.1 g of sodium hydroxide was added.

These three inks are combined for use as a color ink set B10.

Example B19

Preparation of Black Ink B1 and Color Ink Set B11

The cationic water-soluble resin B1 (hydrochloride type) prepared in Example B1 was provided. A 15% aqueous solution of this resin (20 g) was mixed with 6 g of C.I. Direct Black 195, 0.7 g of potassium hydroxide, 10 g of glycerin, 10 g of diethylene glycol monobutyl ether, and 0.8 g of a nonionic surfactant Surfynol 465. Further, ultrapure water was added to bring the total solution amount to 100 g. Thus, a black ink B1 was obtained.

A yellow ink B11, a magenta ink B11, and a cyan ink B11 were prepared in the same manner as used in the preparation of the black ink B1, except that, in the case of the yellow ink B11, 2.5 g of C.I. Direct Yellow 132 was used as the dye; in the case of the magenta ink B11, 2 g of C.I. Acid Red 249 was used as the dye; and in the case of the cyan ink B11, 4 g of C.I. Direct Blue 199 was used as the dye. These three color inks B are combined for use as a color ink set B11.

Example B20

Preparation of Black Ink B2 and Color Ink Set B12

The cationic water-soluble resin B2 (free type) prepared in Example B2 was provided. A 15% aqueous solution of this resin (7.5 g) was mixed with 10 g of C.I. Food Black 2, 0.2 g of potassium hydroxide, 15 g of glycerin, 10 g of triethylene glycol monobutyl ether, 5 g of diethylene glycol, and 1 g of a nonionic surfactant Surfynol 465. Further, ultrapure water was added to bring the total solution amount to 100 g. Thus, a black ink B2 was obtained.

A yellow ink B12, a magenta ink B12, and a cyan ink B12 were prepared in the same manner as used in the preparation of the black ink B2, except that, in the case of the yellow ink B12, 5 g of C.I. Acid Yellow 23 was used as the dye; in the case of the magenta ink B12, 2.5 g of a dye represented by formula (IV) was used as the dye; and in the case of the cyan ink B12, 4 g of C.I. Direct Blue 87 was used as the dye. These three color inks B are combined for use as a color ink set B12.

Example B21

Preparation of Black Ink B3

A styrene/acrylic acid copolymer (tradename: Joncryl 679, Mw 7,000, acid value 200, manufactured by Johnson Polymer Corp.) (8 g) was added to an aqueous solution of 22 g of triethanolamine and 1.7 g of potassium hydroxide in 1,200 g of ultrapure water, followed by dissolution with stirring at 70° C. Furnace black as carbon black (50 g) was added as a colorant to the mixture. After premixing, dispersion was carried out by means of Eiger Mill for 10 hr to prepare a dispersion. In this case, zirconia was used as a dispersion ball. Glycerin (120 g) was added to the dispersion to obtain a black ink B3. The average particle diameter of carbon black in the ink was 160 nm.

Example B22

Preparation of Black Ink B4

An alkali-reactive group-treated carbon black (tradename: Microjet CW-1, manufactured by Orient Chemical Industries Ltd.) (100 g) was added to 400 g of ultrapure water with stirring to prepare a dispersion. Carbon black, glycerin, triethylene glycol monobutyl ether, Surfynol 465, and 2-dimethylaminoethanol were added to the dispersion so that the final ink composition comprised 8% of carbon black, 10% of glycerin, 10% of triethylene glycol monobutyl ether, 1% of Surfynol 465, and 1% of 2-dimethylaminoethanol with the balance consisting of water. Thus, a black ink B4 was obtained. The average particle diameter of carbon black in the ink was 75 nm.

Comparative Example B1

Preparation of Color Ink Set B13

A yellow ink B13, a magenta ink B13, and a cyan ink B13 were prepared in the same manner as in Example B9, except that the cationic water-soluble resin B1 (free type) was not used. These three inks are combined for use as a color ink set B13.

Comparative Example B2

Preparation of Color Ink Set B14

A yellow ink B14, a magenta ink B14, and a cyan ink B14 were prepared in the same manner as in Example B9, except that the cationic water-soluble resin B1 (free type) was changed to SP-200 (tradename; polyethyleneimine, manufactured by Nippon Shokubai Kagaku Kogyo Co., Ltd.). These three inks are combined for use as a color ink set B14.

Comparative Example B3

Preparation of poly(N,N-dimethylallyamine) and Color Ink Set B15

Poly(N,N-dimethylallyamine) formate having a weight average molecular weight was 5,000 was obtained using the materials and method as described in Japanese Patent Publication No. 43402/1988. A yellow ink B15, a magenta ink B15, and a cyan ink B15 were prepared in the same manner as in Example B17, except that 4 g of 15% aqueous solution of this resin was used instead of the aqueous solution of the resin in Example B17. These three inks are combined for use as a color ink set B15.

Evaluation Test on Properties of Ink Composition

The ink compositions prepared above were evaluated by the following methods.

An ink jet printer (a color printer MJ-5000C, manufactured by Seiko Epson Corporation) was modified and used in this test. The inks were filtered through a 5 μm filter before the evaluation test.

Evaluation Test 1

Waterfastness

Acidic plain paper (tradename: Xerox P, manufactured by Fuji Xerox Co., Ltd.) and alkaline plain paper (tradename: Hammer Mill Copy Plus, manufactured by International Paper Company) of size A4 were provided as recording media. 1.5 cm-width black, yellow, magenta, cyan, red, green, and blue full blotted images and letters were printed at intervals of 3.5 cm (nonrecorded area). The prints thus obtained were allowed to stand under natural environment for one hr, and then immersed in 500 ml of water for one hr. After the immersion, the prints were dried under natural environment for 24 hr, and the density of the transfer of the ink onto the nonrecorded area and the residue of the ink on the recorded area were visually inspected. The results were evaluated according to the following criteria.

A: The nonrecorded area was not colored at all, and there was no change in the recorded area.

B: Although the nonrecorded area was slightly colored, there was no change in the recorded area.

C: There was coloration of the nonrecorded area or a lowering in color density in the recorded area.

D: Coloration of the nonrecorded area and a lowering in color density in the recorded area significantly occurred, and, in particular, some letters disappeared and were illegible.

Evaluation Test 2

Lightfastness

The same recording media and printer as used in evaluation test 1 were provided. The black inks and the color ink sets prepared in the examples and comparative examples were combined to print full-color images. The prints were evaluated for lightfastness by the whole-day method in the sunlight test according to JIS L 0841. The results were evaluated according to the following criteria.

A: A change in grade of blue scale of less than 1 as compared with the ink with the cationic water-soluble resin not added thereto.

B: A change in grade of blue scale of 1 or 2.

C: A change in grade of blue scale of more than 2.

Evaluation Test 3

Bleeding

The same recording media and printer as used in evaluation test 1 were provided. The black inks and the color ink sets prepared in the examples and comparative examples were combined to print full-color images. The images were visually inspected for bleeding in the black ink-printed portion. The results were evaluated according to the following criteria.

A: Bleeding did not occur on both the paper and the color print.

B: Although bleeding did not occur on the paper, bleeding somewhat occurred on the color print.

C: Bleeding occurred on both the paper and the color print.

D: Bleeding significantly occurred on any of the paper and the color print.

Evaluation Test 4

Environmental Stability

A hermetically sealed container containing the ink was allowed to stand at 60° C. for one day and then at −30° C. for one day. This procedure was repeated 10 times. The inks were then visually inspected for the occurrence of deposits and discoloration. The results were evaluated according to the following criteria.

A: There was no change in the ink.

B: Deposit or discoloration occurred on such a level as will not cause a practical problem.

C: Deposit or discoloration significantly occurred on such a level as will cause a practical problem.

The evaluation results were as summarized in the following tables.

TABLE 1

| Ink set | Black ink | Water-fastness Acidic paper/ alkaline paper | Light-fastness | Bleeding | Environmental stability |
|---|---|---|---|---|---|
| A1 | A3 | A/A | A | A | A |
| A2 | A3 | A/A | A | A | A |
| A3 | A4 | A/A | A | A | A |
| A4 | A4 | A/A | A | A | A |
| A5 | A4 | A/A | A | A | A |
| A6 | A3 | A/A | A | A | A |
| A7 | A3 | A/A | A | A | A |
| A8 | A3 | A/A | A | A | A |
| A9 | A4 | A/A | A | A | A |
| A10 | A4 | A/A | A | A | A |
| A11 | A1 | A/A | A | C | A |
| A12 | A2 | A/A | A | C | A |
| A13 | A3 | D/D | A | B | A |
| A14 | A4 | A/A | C | A | C |
| A15 | A3 | A/A | B | A | B |

TABLE 2

| Color Ink set | Black ink | Water-fastness Acidic paper/ alkaline paper | Light fastness | Bleeding | Environmental stability |
|---|---|---|---|---|---|
| B1 | B3 | A/A | A | A | A |
| B2 | B3 | A/A | A | A | A |
| B3 | B4 | A/A | A | A | A |
| B4 | B4 | A/A | A | A | A |
| B5 | B4 | A/A | A | A | A |
| B6 | B3 | A/A | A | A | A |
| B7 | B3 | A/A | A | A | A |
| B8 | B3 | A/A | A | A | A |
| B9 | B4 | A/A | A | A | A |
| B10 | B4 | A/A | A | A | A |
| B11 | B1 | A/A | A | C | A |
| B12 | B2 | A/A | A | C | A |
| B13 | B3 | D/D | A | B | A |
| B14 | B4 | A/A | C | A | C |
| B15 | B4 | A/C | A | A | A |

What is claimed is:

1. An ink composition comprising an alkali-soluble colorant, a water-soluble organic solvent, water, and a cationic water-soluble resin,
said cationic water-soluble resin comprising repeating units (a) represented by formula (a) and repeating units (b1) represented by formula (b1) or repeating units (b2) represented by formula (b2):

$$-[CH_2-CH]-$$
$$|$$
$$(CH_2)_m$$
$$|$$
$$N$$
$$R_1 \diagdown R_2$$
(a)

$$-[CH_2-CH]- \quad -[CH_2-CH-------CH-CH_2]-$$
$$| \qquad\qquad\qquad | \qquad\qquad\qquad |$$
$$(CH_2)_n \qquad\qquad CH_2 \qquad\qquad CH_2$$
$$| \qquad\qquad\qquad\qquad\diagdown N \diagup$$
$$H \diagdown N \diagup H \qquad\qquad\qquad |$$
$$\qquad\qquad\qquad\qquad\qquad R_3$$
(b1) (b2)

wherein
$R_1$ and $R_2$, which may be the same or different, each represent a $C_{1-5}$ alkyl group;
$R_3$ represents a hydrogen atom or a $C_{1-5}$ alkyl group; and m and n are each 0, 1, or 2, wherein if the repeating units (b1) are present, the ratio of unit (a) to unit (b1) in the cationic water-soluble resin is 1:4 to 3:1 and, if the repeating units (b2) are present, the ratio of unit (a) to the unit (b2) in the cationic water-soluble resin is 2:8 to 6:4.

2. The ink composition according to claim 1, wherein the repeating units (b1) are present in the cationic water-soluble resin.

3. The ink composition according to claim 1, wherein the repeating units (b2) are present in the cationic water-soluble resin.

4. The ink composition according to claim 1, wherein the cationic water-soluble resin has a weight average molecular weight of 250 to 20,000.

5. The ink composition according to claim 1, wherein the cationic water-soluble resin is in the form of an acid addition salt.

6. The ink composition according to claim 1, which further comprises a basic material.

7. The ink composition according to claim 6, wherein the basic material is a hydroxide of an alkali metal or an alkaline earth metal.

8. The ink composition according to claim 1, wherein, in the unit (a), $R_1$ and $R_2$ each represent a methyl group.

9. The ink composition according to claim 1, wherein the resin comprises units (a) and units (b1) and m and n are each 1.

10. The ink composition according to claim 1, wherein the resin comprises units (a) and units (b2) and, in the unit (b2), $R_3$ represents a methyl group.

11. The ink composition according to claim 1, wherein the resin comprises units (a) and units (b2) and, in the unit (a), m is 1.

12. The ink composition according to claim 1, wherein the resin is a block or random copolymer comprising units (a) and units (b1) or (b2).

13. The ink composition according to claim 1, wherein the water-soluble organic solvent has lower vapor pressure than water.

14. The ink composition according to claim 1, which contains the water-soluble organic solvent in an amount of 5 to 50% by weight based on the total amount of the ink.

15. The ink composition according to claim 1, which further comprises a penetrant selected from the group consisting of lower alcohols, cellosolves, carbitols, and nonionic surfactants.

16. The ink composition according to claim 1, wherein the colorant is a dye or a pigment.

17. The ink composition according to claim 1, which further comprises a water-soluble resin other than the cationic water-soluble resin.

18. An ink set comprising at least a black ink, a yellow ink, a cyan ink, and a magenta ink,
said inks each being the ink composition according to claim 1,
said black ink comprising a colorant selected from the group consisting of C.I. Direct Black 19, 35, 154, 168, 171, and 195 and C.I. Food Black 2,
said yellow ink comprising a colorant selected from the group consisting of C.I. Direct Yellow 50, 55, 86, 132, 142, and 144 and C.I. Acid Yellow 23,
said cyan ink comprising a colorant selected from the group consisting of C.I. Direct Blue 86, 87, and 199 and C.I. Acid Blue 9 and 249,
said magenta ink comprising a colorant selected from the group consisting of C.I. Direct Red 9 and 227, C.I. Acid Red 52 and 289, and colorants represented by formula (II):

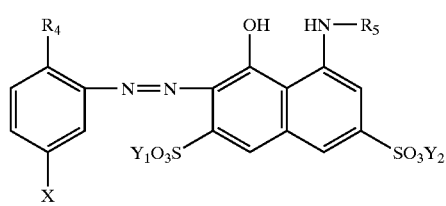

wherein
$R_4$ and $R_5$ each represent a hydrogen atom, a $C_{1-5}$ alkyl group, an aryl group, a $C_{1-5}$ alkoxy group, a phenoxy group or a derivative thereof, a triazine ring or a derivative thereof, a carboxyl group or a salt thereof, or a sulfonyl group or a derivative thereof;
X represents a hydrogen atom or a halogen atom; and $Y_1$ and $Y_2$, which may be the same or different, each represent an alkali metal atom, ammonium, or a $C_{1-5}$ alkylammonium.

19. An ink set comprising a first ink composition or a first group of ink compositions and a second ink composition or a second group of ink compositions,
said first ink composition being the ink composition according to claim 1,
said second ink composition being an ink composition comprising an anionic material.

20. The ink set according to claim 19, wherein
said first group of ink compositions are a yellow ink, a magenta ink, and a cyan ink,
said second ink composition being a black ink.

21. The ink set according to claim 19, wherein
said first ink composition is a black ink,
said second group of ink compositions are a yellow ink, a magenta ink, and a cyan ink.

22. The ink set according to claim 19, wherein the anionic material contained in the second ink composition is an anionic water-soluble resin.

23. The ink set according to claim 22, wherein the colorant contained in the second ink composition is a pigment.

24. The ink set according to claim 19, wherein the anionic material contained in the second ink composition is a pigment having on its surface an anionic functional group.

25. A recording method comprising the step of depositing an ink composition onto a recording medium to form an image, said ink composition being the ink composition according to claim 1.

26. A record produced by the recording method according to claim 25.

27. An ink jet recording method comprising the steps of: ejecting a droplet of an ink composition; and depositing the droplet onto a recording medium to form an image, said ink composition being an ink composition according to claim 1.

28. An ink composition comprising an alkali-soluble colorant, a water-soluble organic solvent, water, a cationic water-soluble resin, and, optionally, an additional water-soluble resin, wherein if the additional water-soluble resin is present, the additional water-soluble resin is nonionic,
said cationic water-soluble resin comprising repeating units (a) represented by formula (a) and repeating units (b1) represented by formula (b1) or repeating units (b2) represented by formula (b2),

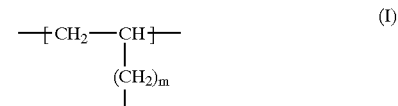

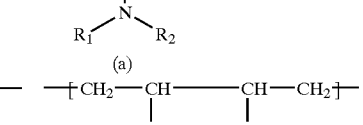

wherein
$R_1$ and $R_2$ which may be the same or different, each represents a $C_{1-5}$ alkyl group;
$R_3$ represents a hydrogen atom or a $C_{1-5}$ alkyl group; and
m and n are each 0, 1, or 2, wherein the repeating units (b1) or (b2) are present in the cationic water-soluble resin with respect to the repeating units (a) in a ratio such that print formed with the ink composition on acidic or alkaline paper has an improved waterfastness or lightfastness as compared with print formed with the ink composition wherein the cationic water-soluble resin is polyallylamine or polyethyleneimine, wherein if the repeating units (b1) are present, the ratio of unit (a) to unit (b1) in the cationic water-soluble resin is 1:4 to 3:1 and, if the repeating units (b2) are present, the ratio of unit (a) to unit (b2) in the cationic water-soluble resin is 2:8 to 6:4.

29. An ink composition according to claim 28, wherein the repeating units (b1) are present in the cationic water-soluble resin.

30. The ink composition according to claim 28, wherein the repeating units (b2) are present in the cationic water-soluble resin.

* * * * *